3,516,132
PROCESS FOR PRODUCING CRYOGENIC CAPACITORS

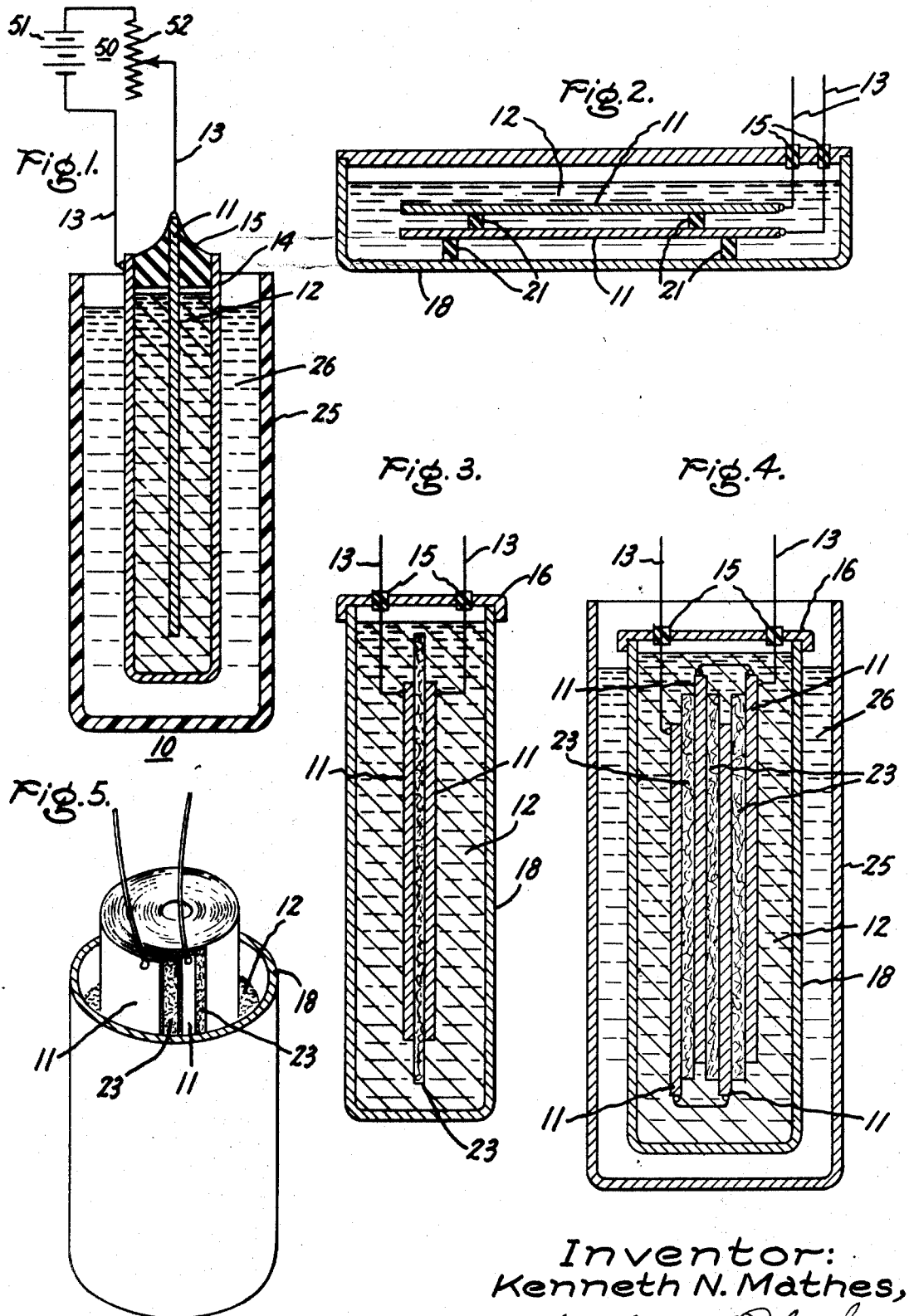

Kenneth N. Mathes, Schenectady, N.Y., assignor to General Electric Company, a corporation of New York
Filed Apr. 8, 1968, Ser. No. 719,541
Int. Cl. H01g 13/00
U.S. Cl. 29—25.41                                                 3 Claims

ABSTRACT OF THE DISCLOSURE

A superior low temperature capacitor device is produced by surrounding a plurality of electrodes with a liquid consisting of 1-nitropropane or a mixture of 1-nitropropane and isopentane and then applying a direct voltage bias while cooling the device to temperatures below about $-100°$ C.

---

This invention relates to an improved process for producing capacitors which are operable at temperatures below about $-100°$ C. and lower.

The invention described herein was made in the performance of work under a NASA contract and is subject to the provisions of Section 305 of the National Aeronautics and Space Act of 1958, Public Law 85–568 (72 Stat. 436; 42 U.S.C. 2457).

A conventional type of capacitor has a pair of parallel, electrically conducting plates or electrodes separated by an electrically insulating or dielectric film and has an electrical lead to each of the electrodes. The dielectric film employed should have a low dissipation factor, be reasonably thin, have a high dielectric constant and a high breakdown strength.

Capacitors which can be employed at temperatures below $-100°$ C. and lower are desirable as energy storage and discharge devices, in electronic circuits, in space applications and for power factor correction. In these types of capacitor applications at low temperatures the decreased size of the energy storage and discharge devices provides associated low conductor resistance and low inductance. The high direct current resistance of the dielectric in such a device is also important in many applications. Such energy storage capacitors have application in atomic fusion, radar and laser power supplies, high energy metal forming and mining, because the desirable small size and reliability justifies the cost of refrigerating such a device.

This invention is directed to an improved process for producing cryogenic capacitors for use at temperatures of $-100°$ C. or lower, which capacitors employ a dielectric consisting of 1-nitropropane or a mixture of 1-nitropropane and isopentane.

In accordance with the process of this invention, an improved cryogenic capacitor is produced by forming a device which comprises a first electrode, a continuous dielectric material contacting a surface of the first electrode, the dielectric comprising 1-nitropropane or a mixture of 1-nitropropane and isopentane, a second electrode in contact with the dielectric with an electrical lead connected to each of the electrodes and a container for holding the dielectric liquid, with a means for cooling said container with the dielectric and electrode to a temperature below about $-100°$ C., and applying a direct voltage bias across the electrodes from a voltage source while cooling to a temperature below about $-100°$ C.

These objects and various other features and advantages of the invention will be better understood from the following description taken in connection with the accompanying drawing.

In producing the cryogenic capacitors by the process of this invention, it is sometimes advantageous to employ a separator such as a porous or fibrous dielectric other than the liquid dielectric to maintain the electrodes spaced apart from each other. The porous, fibrous or open matrix can be, for example, unwoven glass mat or paper, porous alumina, a porous ceramic, woven glass cloth, etc. These separators are then placed between the electrodes and the total structure placed in the container and the liquid 1-nitropropane or mixture of 1-nitropropane and isopentane placed in the container whereby the interstices of the fibrous materials or the pores of the porous materials are filled with the liquid and the electrodes are completely separated by the dielectric liquid. The capacitor device is then placed in a refrigerating means wherein the temperature is lowered to about $-100°$ C. or lower and a direct voltage bias applied to the electrodes.

The improved capacitors produced by the improved process of this invention exhibit a high dielectric constant and a lower dielectric loss at temperatures below about $-100°$ C. then similar capacitors produced without applying the direct voltage while cooling. These cryogenic capacitors are produced in various configurations, for example, a single unit having a first electrode, the dielectric being in intimate contact with the electrode, a second electrode in contact with the dielectric and separated from said first electrode by said dielectric and an electrical lead connected to the electrodes. Other structures include a plurality of stacked, interleaved electrodes separated by the above types of dielectrics and a rolled capacitor.

It has been found that pure, thin aluminum and copper sheet and foil possess very low electrical resistance at these low temperatures, which makes these materials particularly useful as electrodes in the capacitors of this invention.

The dielectrics employed in the capacitors of this invention consist essentially of 1-nitropropane and mixtures of 1-nitropropane and isopentane wherein the amount of isopentane can be up to 50%, by weight, of the total mixture. It is, of course, obvious that there is no lower limit on the amount of isopentane employed.

The amount of direct voltage bias applied to the electrodes can be as low as 50 volts to as much as 2000 volts or more. It is preferred to employ a direct voltage bias of from 200 to 1200 volts across the electrodes.

In some of the configurations of the capacitors of this invention, it will be necessary to employ separators to maintain the spacings of the electrodes in the event that the capacitor be exposed to temperatures greatly above $-100°$ C. whereby the dielectric becomes very fluid. At temperatures below its freezing point the dielectric is, of course, a solid. Such separators can be, for example, strips of woven or unwoven glass fibers, strips of paper, porous alumina or ceramic sheets or small, solid dielectric spacers of alumina or ceramic, etc.

It has been found that the improved capacitors produced by the process of this invention can be allowed to warm to about $-80°$ C. without loss of the improvement imported by the improved process of this invention; however, if the temperature rises to ambient temperatures, i.e., $25°$ C., it is necessary to again apply a direct current bias to obtain the improvement in the dielectric loss.

The means of maintaining the temperature of the cryogenic capacitors of this invention below $-100°$ C. are those known in the refrigeration industry, such as, liquid nitrogen, $CF_4$, methane, and other liquefied gases having boiling points below $-100°$ C. It is, of course, understood that where liquefied gases containing oxygen are employed adequate safety precautions must be taken to prevent contact of the organic material with the refrigerant.

One can also employ mixtures of liquid nitrogen with methylcyclopropane and the like.

FIG. 1 is a sectional view of a cryogenic capacitor of this invention;

FIG. 2 is a sectional view of a modified cryogenic capacitor;

FIG. 3 is a sectional view of another modified cryogenic capacitor;

FIG. 4 is a sectional view of another modified cryogenic capacitor; and

FIG. 5 is a sectional view of rolled cryogenic capacitor in accordance with this invention.

In FIG. 1 of the drawing, there is shown generally at 10 a cryogenic capacitor comprising a first inner electrode 11 of a suitable material such as thin copper or aluminum sheet or foil, and a dielectric material 12 surrounds said first electrode. A second container electrode 14 (which also serves as the container for the dielectric liquid) of similar or dissimilar metal is in contact with the dielectric 12 and spaced apart from the first electrode 11. A pair of electrical leads 13 are connected to the respective electrodes 11 and 14 to complete the capacitor structure. The first electrode 11 extends through a flexible insulating bushing 15 in an annular opening in the second electrode 14. The bushing is constructed of flexible material such as silicone rubber, etc. The bushing should be flexible to allow for expansion and contraction of the dielectric. There surrounds this construction a case 25 constructed of a heat insulating material to hold refrigerating fluid 26. In the process of this invention a unidirectional voltage is applied from a voltage source represented generally at 50 and including, for example, battery 51 and potentiometer 52 which are electrically connected to leads 13 and 14. The refrigerating fluid 26 is added slowly to case 25 in order that the temperature of the electrodes 13 and 14 and dielectric 12 be lowered to at least −100° C.

As it is shown in FIG. 1 of the drawing, the bushing dielectric material extends to the respective edges of both electrodes 11 and 14 and thus prevents arcing or flash over between the electrodes.

It is preferred to form capacitor 10 in FIG. 1 of the drawing by first filling the container with liquid 1-nitropropane or a mixture of 1-nitropropane and isopentane and then suspending the inner electrode 11 in such liquid dielectric 12 and sealing the container electrode 14 with the flexible bushing 15. A variable unidirectional voltage is applied from voltage source 50 and the entire apparatus cooled to temperatures below about −100° C. by adding refrigerating fluid 26 (e.g., liquid nitrogen) to case 25 so that the liquid dielectric 12 becomes very viscous or freezes and thus maintains electrode 11 spaced apart from and out of contact with the container electrode 14.

The above capacitor was tested by immersing the device in the case 25 filled with a refrigerating fluid 26 such as liquid nitrogen or just suspending it above the liquid nitrogen so that the temperature of the capacitor is maintained below about −100° C. and the capacitor was tested for shorts. If no shorts were found the dielectric constant was measured and found to be 45 and the dissipation factor (tan−δ) was 0.017.

In FIG. 2 of the drawing, there is shown a modified capacitor which has a pair of parallel electrodes 11, each of which has a lead 13 connected thereto. The electrodes are maintained in spaced relationship to one another and separated from the container wall by spacers 21. The spacers 21 can be ceramic, alumina and the like. The leads 13 leave the container through an annular orifice filled with the insulating bushing 15 of silicone rubber and the like. The electrodes 11 are surrounded by the dielectric 12.

The capacitor shown in FIG. 2 is formed by inserting spacers 21 in position in case 18, inserting electrode 11, adding the second spacers and then the second electrode 11. The liquid dielectric 12 is then added and a unidirectional voltage applied while the apparatus is cooled to below −100° C. An insulating rubber gasket 15 can then be placed over the opening in case 18 as a seal.

In FIG. 3 of the drawing, there is shown a further modified capacitor in accordance with this invention which employs a pair of parallel electrodes 11, each of which has a lead 13 connected thereto, which leads 13 exit through the container lid 16 through insulating bushing 15. The dielectric material for this capacitor is a composite structure comprising a separator 23 of open, woven glass cloth or unwoven glass mat into which is impregnated with the dielectric liquid 12 which liquid becomes solid when the temperature is lowered below its freezing point. In the preparation of the capacitor the electrodes 11 with the woven glass mat positioned therebetween are suspended in container 18 and the liquid dielectric 12 poured into the container. The electrode leads are then drawn through lid 16 through an annular opening surrounded by the insulating bushing 15 and a unidirectional voltage applied as the temperature was lowered to below about −100° C. The matrix 23 can also be impregnated with the dielectric by vacuum impregnating techniques.

In FIG. 4 of the drawing, there is shown a modified capacitor device which comprises a plurality of interleaved electrodes 11 with a separator 23 comprised of woven or unwoven glass fibers or other porous material therebetween impregnated with dielectric 12 which fills thermal conducting case 18. A plurality of electrode foils with the separators 23 and the dielectric material 12 therebetween are stacked together. In this configuration, the ends of each of the electrodes extend beyond the edges of the stacked extended foil and are arranged in alternate fashion to provide electrical connections. Electrode leads 13 are connected to the electrodes and extend through bushing 15 in lid 16 covering thermal conducting case 18.

The device in FIG. 4 shows a container 25 for a low temperature liquid 26 such as liquid nitrogen, liquid hydrogen or helium, or mixtures of liquid nitrogen and other materials to provide a means whereby the capacitor device is cooled to below −100° C.

In FIG. 5 of the drawing, there is shown a modified capacitor roll device which comprises a pair of electrodes 11 with a porous ceramic or fiber glass separator 23 therebetween which are inserted in thermal conducting case 18 containing dielectric 12 which dielectric has permeated the interstices of the porous separator 23. An additional separator 23 is positioned on the upper surface of the second electrode 11, whereby the layers can be formed into a capacitor roll.

In preparing the devices in the figures it is, of course, obvious that the dielectric material must completely separate the electrodes and that the level of the dielectric in the container must be sufficient so that the electrodes are completely immersed in the dielectric.

Examples of capacitor devices formed in accordance with this invention are as follows:

EXAMPLE 1

A capacitor arrangement, as shown in FIG. 1 of the drawing, was made by suspending an aluminum electrode 11 in a solid nickel container 14 holding approximately 77 cubic centimeters of 1-nitropropane. A direct voltage bias of 500 volts was placed across the electrodes and the nickel container was then surrounded by liquid nitrogen to freeze the dielectric to a solid. The nickel container (capacitor) was then removed from the nitrogen and surrounded with glass fiber thermal insulation so that warming would occur slowly. The measurements of capacitance and dissipation factor were made in accordance with ASTM Method D150. The dissipation factor (tan −δ) of 1-nitropropane at 1 kHz. (1 kilohertz) and at −100° C. was .015, and the permittivity (dielectric constant) was 45 at −105° C. A capacitor produced without applying the direct voltage bias had a tan −δ of 0.15 and a permittivity of 46.

EXAMPLE 2

A capacitor was constructed in accordance with the procedure of Example 1; however, a mixture of 4 parts of 1-nitropropane, by volume, to 1 part, by volume of isopentane was employed as the dielectric. The capacitor was tested by the procedure given in Example 1 and has a permittivity of 40 and a tan—$\delta$ of .03 at —100° C.

EXAMPLE 3

A rolled capacitor as shown in FIG. 5 and employing matted glass fibers as spacers between two aluminum foil electrodes containing wire leads can be rolled so that each metal electrode is separated from the other by the matted, porous glass fibers and the entire construction dipped into a mixture of 4 parts, by volume, of 1-nitropropane and 1 part, by volume, of isopentane and tested in accordance with the procedure of Example 1 to yield a rolled type low temperature capacitor.

Other modifications and variations of the capacitor devices within the scope of this invention other than those in the above examples can be made by referring to the drawings and specifications.

What is claimed as new and is desired to be secured by Letters Patent of the United States is:

1. A process for producing a capacitor for use at temperatures below about —100° C. which comprises establishing two electrodes in spaced relationship with one another, filling the space between the electrodes with a liquid dielectric material selected from the class consisting of 1-nitropropane and a mixture of 1-nitropropane and isopentane and cooling said electrodes and said liquid dielectric material to a temperature below —80° C., the improvement which comprises applying a unidirectional voltage across the electrodes while cooling to below —80° C.

2. A process as in claim 1 wherein the temperature is maintained below at least —100° C.

3. A process as in claim 1 wherein the unidirectional voltage is from 200 to 1200 volts.

References Cited

UNITED STATES PATENTS

| | | | |
|---|---|---|---|
| 2,865,083 | 12/1958 | Kater et al. | 29—25.42 |
| 3,286,014 | 11/1966 | Williams | 317—243 |
| 3,335,343 | 8/1967 | Moore et al. | 29—25.42 |

CHARLIE T. MOON, Primary Examiner

R. B. LAZARUS, Assistant Examiner

U.S. Cl. X.R.

29—25.42; 317—243